April 14, 1970  C. L. JOHNSON ET AL  3,505,829
APPARATUS FOR CONTROLLING AT LEAST ONE RAM
Filed Dec. 6, 1967  5 Sheets-Sheet 1

United States Patent Office 3,505,829
Patented Apr. 14, 1970

3,505,829
APPARATUS FOR CONTROLLING AT LEAST ONE RAM
Christopher Linley Johnson and John Vaughan Rooks, Allestree, Derby, England, assignors to Rolls-Royce Limited, Derby, England, a British company
Filed Dec. 6, 1967, Ser. No. 688,528
Claims priority, application Great Britain, Dec. 22, 1966, 57,582/66
Int. Cl. F02k *1/12, 1/18;* F16d *31/02*
U.S. Cl. 62—242
10 Claims

ABSTRACT OF THE DISCLOSURE

The effective area of a variable area nozzle of a gas turbine engine is controlled by hydraulically operated rams. The control is exercised by an apparatus comprising a variable output hydraulic pump which is connected by ducting to opposite sides of pistons in the rams. The output of the pump can be altered to move the pistons. A by-pass valve is provided for ensuring that the flow through a by-pass conduit is inversely proportional to the pressure differential between the input and output of the pump so that when the pressure differential changes this is compensated for by an inverse change in the flow through the by-pass conduit.

---

Figure 1:
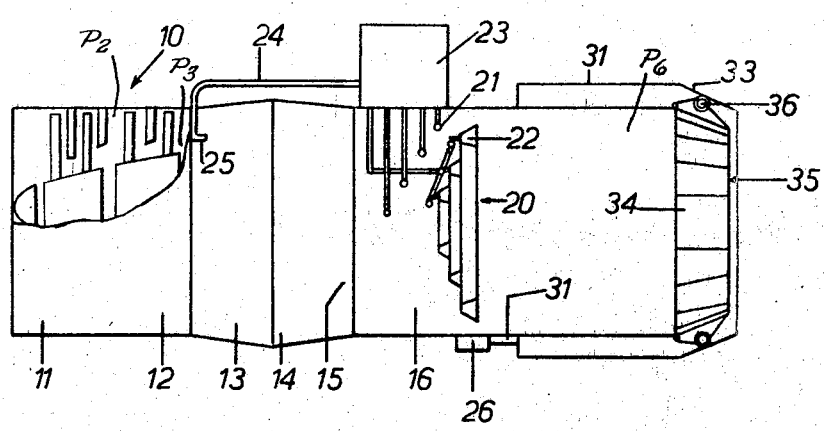

This invention concerns apparatus for controlling at least one ram and it is more particularly concerned with apparatus for controlling rams which adjust the effective area of a variable area nozzle of a gas turbine engine.

According to the present invention, there is provided in a gas turbine engine having low and high compressors, combustion equipment, turbine means, a jet pipe, a variable area nozzle, and at least one ram for varying the effective area of the variable area nozzle, the improvement comprising an apparatus for controlling said at least one ram, said apparatus comprising:

Ducts connecting opposite sides of the pump to opposite sides of the piston of the said ram;

A control unit for varying the output of the pump in dependence upon $$K \cdot P_3/P_6 \cdot f(P_3/P_2)$$

where K is a constant, $f$ is any desired function, $P_2$ and $P_3$ are the pressures at the delivery ends of the low and high pressure compressors respectively of the engine, and $P_6$ is the pressure in the jet pipe of the engine, whereby to alter the differential between the pressures prevailing in said ducts and thus to alter the position of the said piston;

Means for passing a minor proportion of the output of the pump through at least one passage the flow through which does not affect the position of the said piston;

At least one by-pass conduit extending between and communicating with the respective said ducts, the flow through the by-pass conduit passing from the high pressure to the low pressure side of the pump without affecting the position of the said piston; and A by-pass valve for the by-pass conduit which ensures that the flow through the by-pass conduit is inversely proportional to the said pressure differential, whereby if the said pressure differential is increased or reduced, there is an increased or reduced flow, respectively, to the said at least one passage, and this flow is substantially completely compensated by a respectively reduced or increased flow through the by-pass conduit.

The or each by-pass valve may comprise a valve member opposite faces of which art respectively open to pressures functionally related to those prevailing in the respective said ducts.

Means may be provided for varying the functional relationship between one of the pressures acting on the or each valve member and the pressure in the corresponding duct.

The or each valve member may be a diaphragm which is resiliently biased open, the higher of the pressures acting on the diaphragm urging the diaphragm closed.

The or each by-pass conduit may contain a nonreturn valve which presents the reversal of flow through the by-pass conduit.

The or each ram may be a double acting ram, the output of the pump being reversible.

The pump is preferably a swash plate pump, the means for varying the output of the pump varying the angle of the swash plate.

The said one or more passages may include at least one drain passage leading from the or each ram to the pump and/or at least one passage the flow through which cools the or each ram.

At least one of the said ducts may incorporate a flow path through a heat exchanger.

The ram or rams may thus control the axial position of a sleeve the position of which determines the effective area of the nozzle, the sleeve being connected to valve means which control flow through a by-pass passage extending between the ducts of the respective ram, so that the said valve means are opened when the nozzle is moved to its minimum area position.

Figure 2:
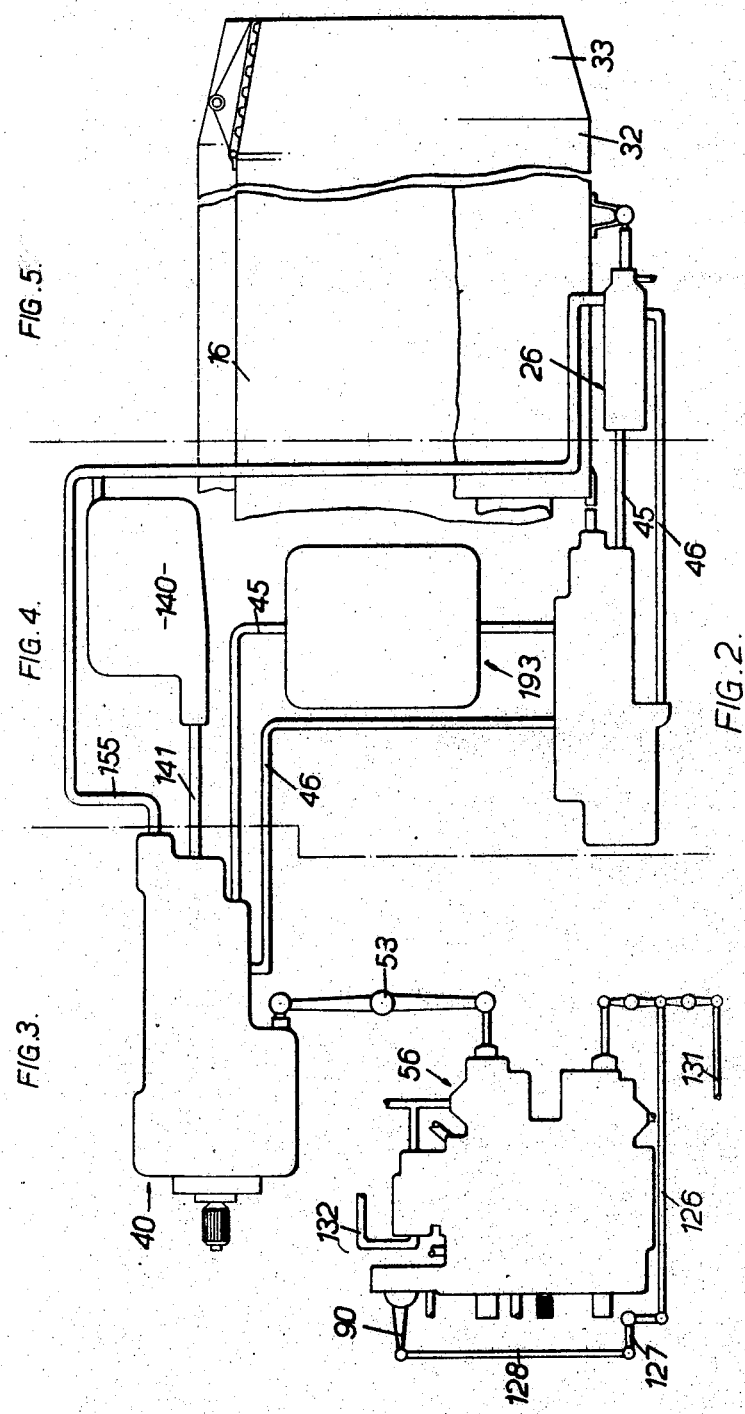
Figure 3:
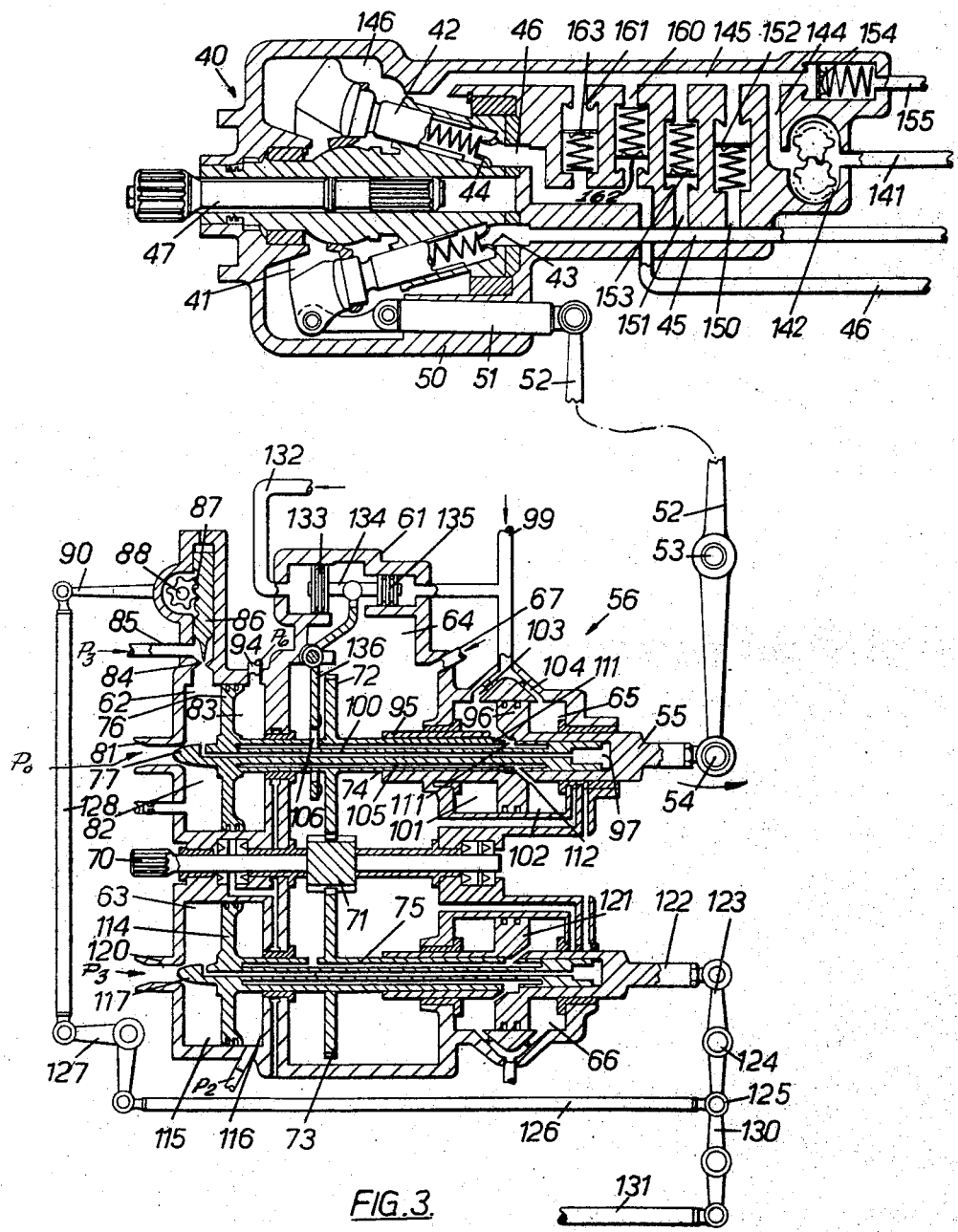
Figure 4:
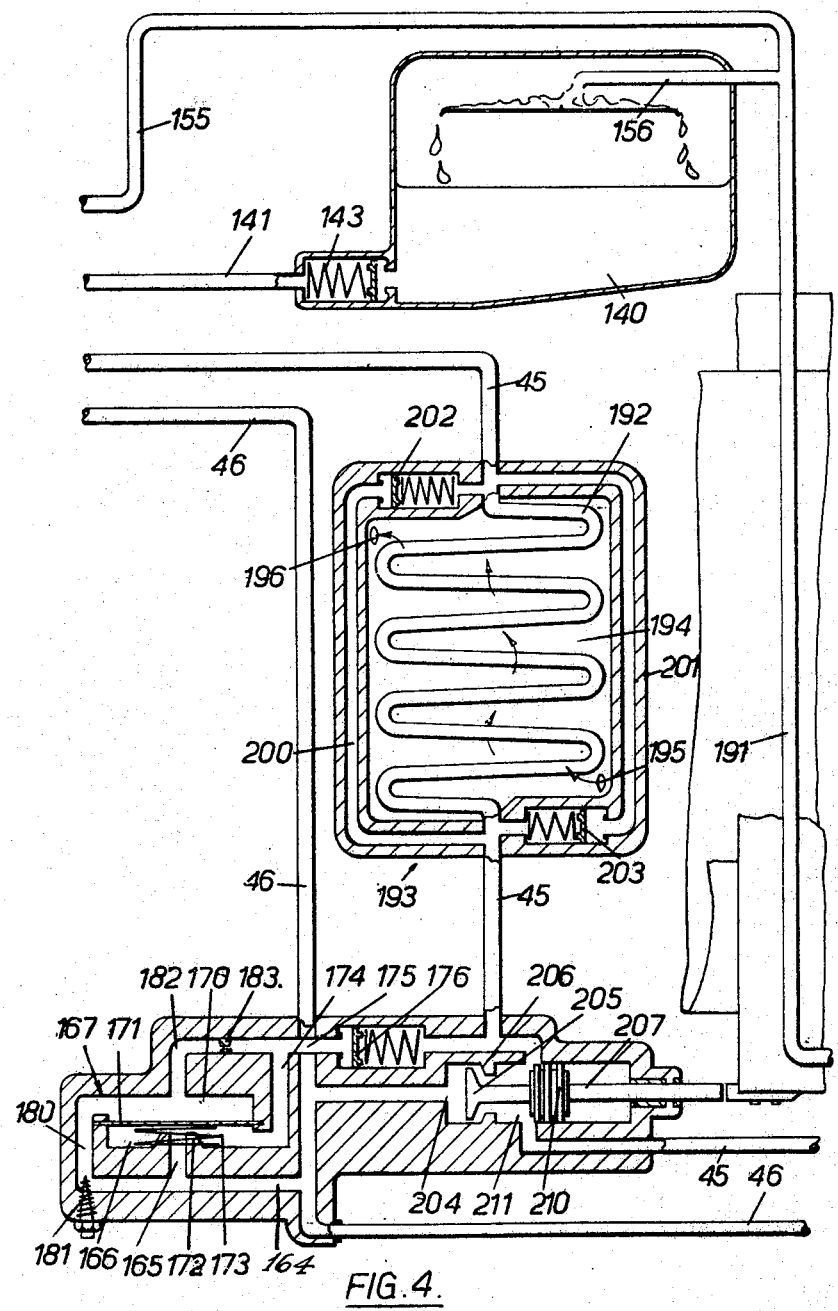
Figure 5:
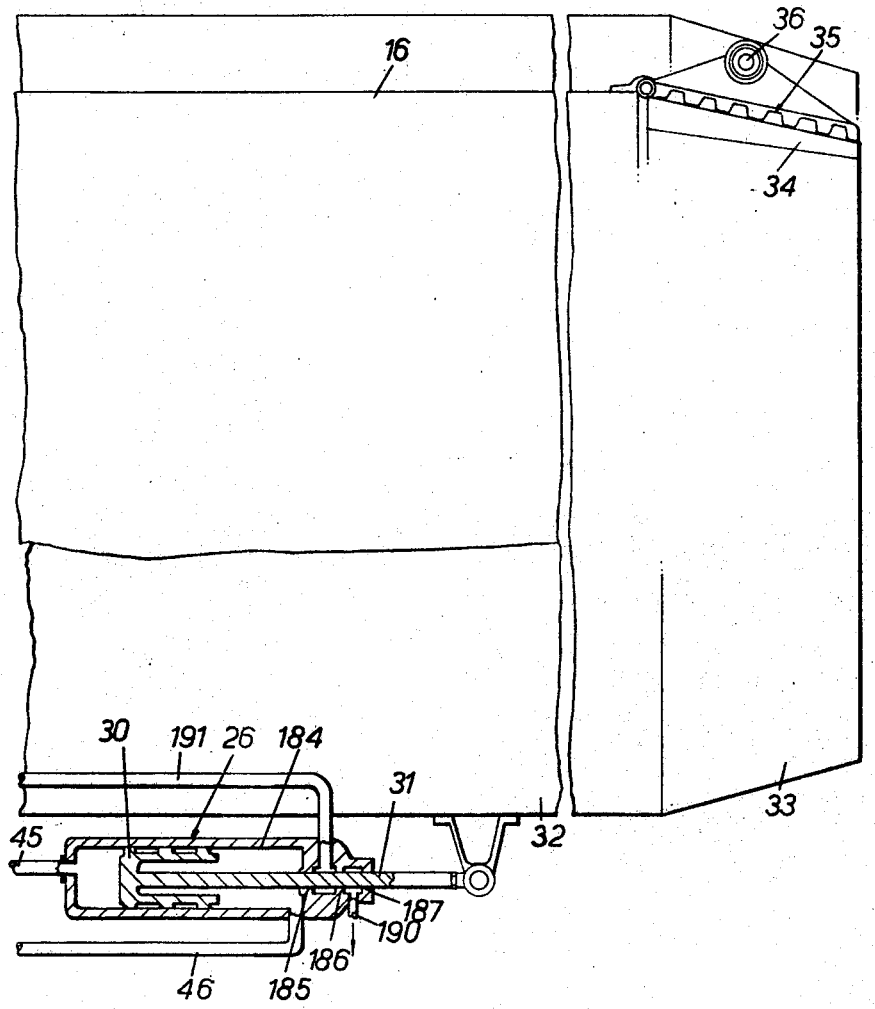

The invention is illustrated, merely by way of example, in the accompanying drawings, in which:

FIGURE 1 which is a diagrammatic view of a gas turbine engine having a variable area nozzle whose effective area is adjustable by apparatus according to the present invention, FIGURE 2 is a diagrammatic view of the said apparatus, FIGURES 3, 4 and 5 are views on a larger scale of portions of the apparatus shown in FIGURE 2.

Terms such as "left," "right," "upper" and "lower" as used in the description below are to be understood to refer to directions as seen in the drawings.

In FIGURE 1 there is shown a gas turbine engine 10 which is adapted for use as a forward propulsion engine of an aircraft and which comprises in flow series a low pressure compressor 11, a high pressure compressor 12, main combustion equipment 13, a high pressure turbine 14, and a low pressure turbine 15, the turbine exhaust gases passing to atmosphere through a jet pipe 16.

Reheat combustion equipment 20, which includes main burners 21 and pilot burners 22 is mounted in the jet pipe 16. The burners 21, 22 are supplied with reheat fuel from a reheat fuel system 23. The reheat fuel system 23 also provides, when required, a flow of fuel via a passage 24 to hot streak injectors 25. The fuel supplied to the injectors 25 is injected into the main combustion equipment 13 and is passed through the turbines 14, 15 as a "hot streak" to effect ignition of the reheat fuel supplied to the pilot burners 22.

Mounted about the jet pipe 16 are a plurality (e.g., six) of double-acting nozzle rams 26. In order, however, to simplify both the description and the drawings, only one ram 26 is shown and will be described.

The ram 26 has a piston 30 (FIGURE 5) whose piston rod 31 is connected to an axially movable sleeve 32 which is mounted concentrically about the downstream end of the jet pipe 16.

The sleeve 32 has a frusto-conical downstream end 33 which tapers in a downstream direction. The downstream end of the jet pipe 16 is provided with a plurality of pivotally mounted nozzle members or "fingers" 34 which collectively constitute a variable area nozzle 35. Each of the nozzle members 34 is provided with a roller 36 which engages the downstream end 33 of the sleeve 32.

Accordingly, when the ram 26 causes axial movement of the sleeve 32 in a downstream direction, the nozzle members 34 will be able to move radially outwardly under the force of the jet gases so as to increase the effective area of the nozzle 35, while axial movement of the sleeve 32 in an upstream direction will force the nozzle members 34 radially inwardly so as to decrease the effective size of the nozzle 35.

It will be appreciated, therefore, that to retain the nozzle members 34 in any desired position it will be necessary to have a differential pressure across the piston 30 to counteract the force of the jet gases on the nozzle members 34. Thus, a greater force is necessary to move the nozzle members 34 into the jet stream than out of it since in the latter case movement will be assisted by the jet gases themselves.

The position of the piston 30 of the ram 26 is controlled by a swash plate pump 40 (FIG. 3). The swash plate pump 40 is a variable output pump whose output is altered by the inclination of a swash plate 41, the inclination of the swash plate 41 controlling the stroke of a plurality of variable stroke plungers 42. The swash plate pump 40 has ports 43, 44 which normally act respectively as inlet and outlet ports on the low pressure and high pressure sides respectively of the swash plate pump 40. When the inclination of the swash plate 41 is appropriately altered, however, the swash plate pump 40 is reversed so that the ports 43, 44 respectively become the outlet and inlet ports of the pump.

The ports 43, 44 are respectively connected to ducts 45, 46 which lead to the left and right hand sides respectively of the piston 30 of the ram 26. As will be appreciated, reversal of the swash plate pump 40 reverses the direction in which the ram 26 acts.

The swash plate 41 is mounted on a drive shaft 47 which is driven from the engine 10 by means not shown.

The swash plate pump 40 has a body 50 in which is slidably mounted a push rod 51. The left hand end of the push rod 51 is pivotally connected to the swash plate 41, the right hand end of the push rod 51 being pivotally connected to the upper end of a lever 52. The lever 52, which is mounted on a fixed fulcrum 53, is pivotally connected at its lower end 54 to a piston rod 55 which forms part of a control unit 56.

The control unit 56 has a body 61 within which there are formed chambers 62, 63, 64, 65, 66. The chamber 64 communicates, via a pipe 67, with a supply of low pressure fuel from the reheat fuel system 23.

Mounted within the body 61 is an engine driven shaft 70 on which is mounted a gear 71 which is disposed within the chamber 64. The gear 71 meshes with gears 72, 73 which are respectively mounted on hollow stems 74, 75.

The hollow stem 74 extends into the chamber 62 where it is provided with a piston 76 which carries a valve head 77. The piston 76 is slidable within the chamber 62, the valve head 77 controlling flow between the interior of the chamber 62, and a passage 81 which is open to the ambient static air pressure ($P_0$).

The piston 76 divides the chamber 62 into spaces 82, 83 which are respectively disposed to the left and to the right of the piston 76.

The space 82 communicates via a restriction 84 with a pipe 85, the pipe 85 being supplied, by means not shown, with a supply of air at the pressure $P_3$ prevailing at the delivery end of the high pressure compressor 12. The effective size of the restriction 84 is controlled by a needle valve 86 which is provided with a rack 87 which meshes with a pinion 88. The pinion 88 is rotatable by a link 90 movement of which is effected by means described below.

The pressure in the space 82 will therefore be functionally related to the ratio $P_3/P_0$, the particular pressure prevailing at any moment in the space 82 depending of course not merely on this ratio but also on the positions of the valve head 77 and needle valve 86.

The space 83 communicates, by way of a pipe 94, with a supply of air at the pressure $P_6$ which prevails in the jet pipe 16. The position of the piston 76 will therefore be controlled in function dependence upon the value of the ratio $P_3/P_6$.

The hollow stem 74 is slidably mounted within a sleeve 95 which carries a piston 96, the piston 96 being slidably mounted in the chamber 65. A space 97 is provided within the sleeve 95 to the right of the hollow stem 74.

The valve head 77 is formed at the end of a tube 100 which extends through the hollow stem 74. The tube 100 provides communication between the spaces 82, 97, whereby to effect pressure balancing of the hollow stem 74.

The piston 96 divides the chamber 65 into spaces 101, 102 which are respectively disposed to the left and to the right of the piston 96. The spaces 101, 102 respectively communicate by way of restricted passages 103, 104 with a pipe 99 through which high pressure fuel is supplied from the reheat fuel system 23. The spaces 101, 102 are therefore supplied with pressurized fuel.

Between the hollow stem 74 and the tube 100 there is an annular space 105 which communicates with the chamber 64 by way of drillings 106 in the hollow stem 74. The hollow stem 74 has drillings 110 which, on appropriate movement of the hollow stem 74, may be brought into communication with drillings 111 in the sleeve 95 and/or with drillings 112 therein. The drillings 111, 112 respectively communicate with the spaces 101, 102.

Accordingly, if the pressure ratio $P_3/P_6$ increases, the piston 76 will move towards the right whereby the drillings 110 will communicate with the drillings 112. The pressure in the space 102 will therefore fall since fuel may flow through the drillings 112, 110, annular space 105, drillings 106, chamber 64, and so through the pipe 67 to the source of low pressure fuel. The piston 96 will therefore also move to the right and will consequently, via the piston rod 55, lever 52, and push rod 51, cause adjustment of the inclination of the swash plate 41, whereby to cause the ram 26 to reduce the effective area of the nozzle 35.

On the other hand, if the pressure ratio $P_3/P_6$ decreases, the piston 76 will move towards the left whereby the drillings 110 will communicate with the drillings 111. The pressure in the space 101 will therefore fall since fuel may flow through the drillings 111, 110, annular space 105, drillings 106, chamber 64, and pipe 67 to the said source of low pressure fuel. The piston 96 will therefore also move towards left, and the inclination of the swash plate 41 will be adjusted in the opposite direction to that discussed above, whereby to cause the ram 26 to increase the effective area of the nozzle 35.

Mounted in the chamber 63 is a piston 114 which divides the chamber 63 into spaces 115, 116 which are respectively disposed to the left and to the right of the piston 114. The piston 114 carries a valve head 117 which controls flow through an opening 120 through which air at a pressure functionally related to the pressure $P_3$ may enter the space 115. The space 116 is supplied, by means not shown, with air at the pressure $P_2$ which prevails at the delivery end of the low pressure compressor 11. The position of the piston 114 controls the position of a piston 121 in the chamber 66 by means which are not described since they correspond closely to those provided between the piston 76 and the piston 96.

The piston 121 has a piston rod 122 which is pivotally connected to the upper end of a lever 123 which is mounted on a fulcrum 124. The lower end of the lever 123 is pivotally connected, at a pivot 125, to a link 126. The link 126 is connected via a bell crank lever 127 to a link 128 and so to the link 90 which is arranged to rotate the pinion 88.

As will therefore be appreciated the swash plate 41 is controlled in dependence upon the ratio $$K \cdot P_3/P_6 \cdot f(P_3/P_2)$$

where K is a constant, and $f$ is a function whose value is affected by the profile of the needle valve 86.

It is not possible to maintain the gas turbine engine on the normal working line thereof when reheat is employed merely by controlling the effective area of the nozzle 35 in accordance with the ratio $P_3/P_6$ since this ratio will itself change with change in compressor inlet temperature. It is for this reason that it has been found that the control of the nozzle 35 in accordance with the ratio $P_3$, $P_6$ needs to be modified and it has been found that this can suitably be modified by use of the ratio $P_3/P_2$ in the manner described above in connection with the description of the control unit 56.

The lever 123 is also pivotally connected at the pivot 125 to a lever 130 which is connected, via a link 131, to operate parts (not shown) of the reheat fuel system 23.

The reheat fuel system 23 incorporates a servo mechanism (not shown) which is hydraulically operated by the pressure in a pipe 132. The pressure in the pipe 132 is adjusted by a piston 133 which is connected via a rod 134 to a piston 135 which is open to the high pressure fuel in the pipe 99. The rod 134 is also connected to a pivoted lever 136 which is engagable with the gear 72 for positioning of the latter.

The swash plate pump 40 is supplied with oil from a tank 140, the pressure of the oil in the tank 140 being, for example, six pounds per square inch. Oil from the tank 140 is supplied, via a pipe 141, to a backing pump 142. The pipe 141 communicates with the tank 140 by way of a nonreturn valve 143 which opens in response to a pressure of, say, half a pound per square inch and which permits flow only in the direction of the backing pump 142. This arrangement is provided to ensure that the pipe 141 is always full of oil.

The output from the backing pump 142 is supplied via a pipe 144 to a pipe 145 which communicates with the interior 146 of the body 50 of the swash plate pump 40.

Extending between the pipe 145 and the duct 45 are ducts 150, 151 which respectively contain nonreturn valves 152, 153. The nonreturn valve 152, which may, for example, open when subjected to pressure of at least half a pound per square inch, permits flow only in the direction of the duct 45, while the nonreturn valve 153, which may, for example open only when subject to pressure of at least 320 pounds per square inch, permits flow only in the direction of the pipe 145.

The pipe 145 communicates by way of a nonreturn valve 154 with a pipe 155 which leads via a pipe 156 to the tank 140. The nonreturn valve 154, which may, for example, be arranged to open when subjected to a pressure of at least 50 pounds per square inch, permits flow only in the direction of the tank 140.

Extending between the pipe 145 and the duct 46 are ducts 160, 161 in which are respectively disposed nonreturn valves 162, 163. The nonreturn valve 162, which may, for example, be arranged to be opened when subjected to pressure of at least 3000 pounds per square inch, is arranged to permit flow only in the direction of the passage 145. The nonreturn valve 163, which may, for example, be arranged to be opened when subjected to a pressure of at least half a pound per square inch, is arranged to permit flow only in the direction of the duct 46.

The arrangement is thus such that, when the parts are disposed as shown in the drawings, the output of the backing pump 142 is supplied to the duct 45, and thus to the low pressure side of the swash plate pump 40, through the duct 150. The nonreturn valve 152 will thus be open at this time, but the nonreturn valve 163 will of course be held on its seating by the high pressure in the duct 46.

If, at this time, the pressure in the duct 46 exceeds 3000 pounds per square inch the nonreturn valve 162 will open so as to permit oil to pass into the passage 145 and so through the nonreturn valve 154 to the tank 140.

If however, the inclination of the swash plate 41 is changed so that the ports 43, 44 respectively become the outlet and the inlet ports of the swash plate pump 40, the output from the backing pump 142 is supplied to the duct 46 by way of the duct 161, while the nonreturn valve 152 will be held on its seating by the high pressure in the duct 45. The nonreturn valve 153 will be openable at this time if the pressure in the duct 45 exceeds 320 pounds per square inch, whereby protection is afforded to prevent excessive pressure being applied to the port 43.

As will be appreciated, variation of the output of the swash plate pump 40 by the control unit 56 alters the differential between the pressures prevailing in the ducts 45, 46 and thus alters the position of the piston 30 of the ram 26.

The duct 46 communicates with a conduit 164 which in turn communicates, by way of a conduit 165, with a space 166 within a chamber 167. The space 166 is separated from a space 170 within the chamber 167 by means of a diaphragm 171. The conduit 165 communicates with the space 166 at an inlet port 172 which constitutes a valve seat for the diaphragm 171 which itself in effect forms a valve member. Thus flow of oil from the conduit 165 into the space 166 depends on the spacing of the diaphragm 171 from the inlet port 172.

Mounted within the space 166 concentrically about the inlet port 172 is a spring 173 which resiliently biases the diaphragm 171 to an open position in which it is spaced from the inlet port 172.

The space 166 communicates, by way of a conduit 174, with a conduit 175 which itself communicates, by way of a nonreturn valve 176, with a part of the duct 45. The nonreturn valve 176 which may, for instance, be arranged to be operated by a pressure of at least half a pound per square inch and which may have a leakage therethrough for cooling purposes, is arranged to permit flow (other than leakage flow) only in the direction towards the duct 45.

As will thus be appreciated, the conduits 164, 165, space 166, and conduits 174, 175 collectively constitute a by-pass conduit the flow through which passes from the duct 46 to the duct 45 (and hence from the high pressure side to the low pressure side of the swash plate pump 40) without affecting the position of the piston 30 of the ram 26. The diaphragm 171 thus constitutes a by-pass valve which controls the flow passing through this by-pass conduit 164, 165, 166, 174, 175.

The space 170 above the diaphragm 171 communicates with the conduit 164 by way of a conduit 180 which contains an adjustable needle valve 181. The space 170 also communicates with the conduit 175 by way of a conduit 182 which contains a restriction 183. The pressure in the space 170 will thus be intermediate the pressure in the conduit 164 and the pressure in the conduit 175. Accordingly, the pressure in the space 170 will always be greater than that in the space 166 provided, of course, that the ports 43, 44 of the swash plate pump 40 are respectively being used as the inlet and outlet ports thereof. Thus, as the output of the pump 40 is increased, or reduced, the pressure differential between the pressures prevailing in the ducts 45, 46 will also be respectively increased, or reduced, and there will thus be a corresponding respective increase or reduction in the differential pressures prevailing in the spaces 166, 170. Accordingly, as the output of the pump 40 is increased, or reduced, the flow through the inlet port 172 is respectively reduced, or increased, by the movement of the diaphragm 171 towards or away from it, and there will thus respectively be reduced or increased flow through the by-pass conduit 164, 165, 166, 174, 175. The flow through the bypass conduit is therefore inversely proportional to the pressure differential between the pressures prevailing in the ducts 45, 46.

The piston 30 of the ram 26 is slidably mounted in a valve body 184 of the ram 26. The piston rod 31 of the ram 26 is slidably mounted in bearings 185, 186, 187 in the body 184, and oil which has leaked past these bearings may either pass through a drain passage 190 to the port 43 of the swash plate pump 40, or may pass through a drain passage 191 and the pipe 156 to the tank 140 and thus ultimately to the port 43 of the swash plate pump 40. Additionally, a further passage (not shown) may be provided by means of which oil may pass from the duct 45 and axially through a bore (not shown) in the piston rod 31 so as to pass back to the port 43 of the swash plate pump 40, the purpose of this flow of oil being to cool the piston 30 of the ram 26. Thus a minor proportion of the output of the swash plate pump 40 passes to the drain passages 190, 191 and to the cooling flow passage, the flow of oil through these passages not affecting the position of the piston 30.

As will be appreciated, increased pressure prevailing in the jet pipe 16 necessitates the supply of an increased pressure differential across the ram 26, and thus an increase in the pressure differential prevailing in the ducts 45, 46, there will, in consequence, be an increased flow through the drain passages 190, 191 and through the said cooling flow passage. This increased pressure differential, however, will also result in a reduced flow through the by-pass conduit 164, 165, 166, 174, 175. Accordingly, by adjusting the needle valve 181 it may be arranged that this reduced flow through the by-pass conduit substantially completely compensates for the increased flow through the drain passages 190, 191 and through the said cooling flow passage.

Similarly, if the pressure differential between the pressures prevailing in the ducts 45, 46 is reduced, and there is in consequence a reduced flow through the drain passages 190, 191 and through the said cooling flow passage, this flow is compensated by an increased flow through the by-pass conduit 164, 165, 166, 174, 175 as a result of the diaphragm 171 moving further away from the inlet port 172.

The purpose of the nonreturn valve 176 is to prevent the reversal of flow through the by-pass conduit 164, 165, 166, 174, 175, when the ports 43, 44 are respectively the outlet and inlet ports of the swash plate pump 40.

The duct 45 incorporates a flow path 192 through a heat exchanger 193, the flow of oil passing through the flow path 192 passing in heat exchange relationship with a flow of fuel which passes through a chamber 194 within the heat exchanger 193. The fuel enters the chamber 194 through an inlet port 195 and leaves the chamber 194 through an outlet port 196. By-pass passages 200, 201 which respectively contain nonreturn valves 202, 203, are provided to permit oil to by-pass the heat exchanger 193.

Each of the nonreturn valves 202, 203 may, for example, be arranged to be operated by pressures in excess of 25 lbs. per square inch.

The nonreturn valve 202 permits flow only in the direction of the swash plate pump 40, while the nonreturn valve 203 permits flow only in the opposite direction. The nonreturn valves 202, 203 are thus provided to cater for reversal of the pump 40 so that however the pump 40 is operated the pressure in the flow path 192 will not exceed 25 lbs. per square inch.

The heat exchanger 193 may possibly be dispensed with if cooling fans (not shown) are provided on the ram 26.

Between the ducts 45, 46, and adjacent to the by-pass conduit 164, 165, 166, 174, 175, there is disposed a by-pass passage 204. The flow through the by-pass passage 204 is controlled by a valve 205 which is adapted to co-operate with a valve seat 206. The valve 205 is provided with a valve rod 207 which is secured to the sleeve 33. The valve rod 207 is mounted within a bush 210 which is slidably mounted in a chamber 211 which, in effect, forms part of the conduit 45. The arrangement is such that when the nozzle 35 is moved to its minimum area position, the valve 205 is opened to permit flow between the ducts 45, 46, such flow by-passing the ram 26.

In operation, when a change in the ratio $P_3/P_6$ occurs, the effective area of the nozzle 35 will be adjusted, and this will in turn restore the value of the said ratio to a predetermined value. The rate of change of the effective area of the nozzle 35 is thus proportional to the departure of the ratio $P_3/P_6$ from the predetermined value. The rate of change of the nozzle area is, however, substantially equivalent to the speed of movement of the piston 30, which is itself proportional to the flow of oil through the ram 26, which in turn is substantially proportional to the stroke of the pump 40 at fixed engine speed. It is therefore desirable that the stroke of the pump 40 is proportional to the departure of "error" of the ratio $P_3/P_6$ from the said predetermined value, and therefore that the stroke of the pump 40 should be kept constant for all steady running nozzle areas. This, however, would not normally be possible because the nozzle load rises during reheat and there is thus an increased leakage through the drain passages 190, 191 and through the said cooling flow passage. This would normally lead to an increase in pump stroke. Other things being equal, therefore, the effect of this leakage would be that the nozzle 35 would not have zero velocity at an exactly fixed ratio $P_3/P_6$. This is, however, corrected in the case of the present invention by reason of the fact that the diaphragm 171 controls the flow through the by-pass conduit 164, 165, 166, 174, 175 in inversely proportional relationship to the pressure differential between the ducts 45, 46.

The invention thus provides for the control of the nozzle 35 by the swash plate pump 40 in such a way that both the pressure and flow supplied by the pump 40 is closely matched to what is required for operation of the nozzle 35. If, in contrast to this arrangement, any appreciable flow or pressure from the pump 40 were wasted, the heat generated in the oil circulating in the ducts 45, 46 and through the ram 26 would be sufficient in certain circumstances to make the heat exchanger 193 operate at excessive fuel and oil temperatures.

Under reverse load conditions, the diaphragm 171 would, other things being equal, have the effect of increasing the flow through the by-pass conduit 164, 165, 166, 174, 175 with an increasing pressure differential between the ducts 45, 46. This is obviously undesirable and it is for this reason that the non-return valve 176 is provided.

There will therefore be a variable error in the ratio $P_3/P_6$ with this arrangement, since in reverse load cases, the stroke of the pump 40 will vary slightly. The error so introduced, however, is not substantial.

When reheat is cancelled it is required to control the nozzle area very closely to a fixed minimum value.

Low pressure oil is admitted to the left hand side of the piston 133 through the pipe 132. This causes the piston 133 to move to the left under the action of the high pressure fuel which is constantly applied to the piston 135. The lever 136 attached to the rod 134 then displaces the hollow stem 74 and its associated piston rod 55 a fixed distance towards the right, which causes the swash plate 41 to move to a nozzle closing position. The pump flow delivered in this position is sufficient to cover all leakage and cooling flows.

At the minimum area position, the nozzle 35 will lift the valve 205 off its seat 206. Excess oil flow delivered by the pump 40 is therefore spilled through the valve seat 206 back to the low pressure side of the pump 40.

We claim:
1. In a gas turbine engine having low and high pressure compressors, combustion equipment, turbine means, a jet pipe, a variable area nozzle, at least one ram for varying the effective area of the variable area nozzle, the improvement comprising an apparatus for controlling said at least one ram, said apparatus comprising:
   ducts connecting opposite sides of the pump to opposite sides of the piston of the said ram;
   a control unit for varying the output of the pump in dependence upon

$$K \cdot P_3/P_6 \cdot f(P_3/P_2)$$

where K is a constant, $f$ is any desired function, $P_2$ and $P_3$ are the pressures at the delivery ends of the low and high pressure compressors respectively of the engine, and $P_6$ is the pressure in the jet pipe of the engine, whereby to alter the differential between the pressures prevailing in said ducts and thus to alter the position of the said piston;
   means for passing a minor proportion of the output of the pump through at least one passage the flow through which does not affect the position of the said piston;
   at least one by-pass conduit extending between and communicating with the respective said ducts, the flow through the by-pass conduit passing from the high pressure to the low pressure side of the pump without affecting the position of the said piston; and
   a by-pass valve for the by-pass conduit which ensures that the flow through the by-pass conduit is inversely proportional to the said pressure differential, whereby if the said pressure differential is increased or reduced, there is an increased or reduced flow, respectively, to the said at least one passage, and this flow is substantially completely compensated by a respectively reduced or increased flow through the by-pass conduit.

2. In a gas turbine engine as claimed in claim 1 in which the by-pass conduit contains a nonreturn valve which prevents the reversal of flow through the by-pass conduit.

3. In a gas turbine engine as claimed in claim 1 in which the ram is a double acting ram, the output of the pump being reversible.

4. In a gas turbine engine as claimed in claim 1 in which the pump is a swash plate pump, the means for varying the output of the pump varying the angle of the swash plate.

5. In a gas turbine engine as claimed in claim 1 in which there is at least one drain passage leading from the ram to the pump and at least one passage the flow through which cools the ram.

6. In a gas turbine engine as claimed in claim 1 in which at least one of said ducts incorporates a flow path through a heat exchanger.

7. In a gas turbine engine as claimed in claim 1 in which the ram controls the axial position of a sleeve the position of which determines the effective area of the nozzle, the sleeve being connected to valve means which control flow through a by-pass passage extending between the ducts of the ram, so that the said valve means are opened when the nozzle is moved to its minimum area position.

8. In a gas turbine engine as claimed in claim 1 in which the by-pass valve comprises a valve member opposite faces of which are respectively open to pressures functionally related to those prevailing in the respective said ducts.

9. In a gas turbine engine as claimed in claim 8 in which means are provided for varying the functional relationship between one of the pressures acting on the valve member and the pressure in the corresponding duct.

10. In a gas turbine engine as claimed in claim 8 in which the valve member is a diaphragm which is resiliently biased open, the higher of the pressures acting on the diaphragm urging the diaphragm closed.

References Cited

UNITED STATES PATENTS

| | | | |
|---|---|---|---|
| 2,936,581 | 5/1960 | Williams | 60—242 |
| 3,060,680 | 10/1962 | Wilde et al. | 60—242 X |
| 3,227,048 | 1/1966 | Criffield et al. | 60—242 X |
| 3,253,411 | 5/1966 | Swedberg. | |
| 3,383,857 | 5/1968 | Rajchel et al. | |
| 2,472,477 | 6/1949 | Harrington. | |
| 2,929,212 | 3/1960 | Lewis. | |
| 3,413,895 | 12/1968 | Matthews | 60—242 |

MARK M. NEWMAN, Primary Examiner

U.S. Cl. X.R.

60—53